(12) United States Patent
Shen et al.

(10) Patent No.: US 11,755,246 B2
(45) Date of Patent: Sep. 12, 2023

(54) EFFICIENT RANK SWITCHING IN MULTI-RANK MEMORY CONTROLLER

(71) Applicant: Advanced Micro Devices, Inc., Santa Clara, CA (US)

(72) Inventors: Guanhao Shen, Austin, TX (US); Ravindra Nath Bhargava, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 43 days.

(21) Appl. No.: 17/357,007

(22) Filed: Jun. 24, 2021

(65) Prior Publication Data

US 2022/0413759 A1 Dec. 29, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 13/4031; G06F 13/364; G06F 13/362
See application file for complete search history.

(56) References Cited

U.S. PATENT DOCUMENTS

| | | | |
|---|---|---|---|
| 10,402,120 B2 | 9/2019 | Balakrishnan | |
| 2007/0162715 A1* | 7/2007 | Tagawa | G06F 13/1647 711/158 |
| 2009/0216939 A1* | 8/2009 | Smith | G06F 13/4239 711/E12.083 |
| 2010/0318750 A1 | 12/2010 | Eckert | |
| 2011/0238941 A1 | 9/2011 | Xu et al. | |
| 2012/0023363 A1* | 1/2012 | Shaeffer | G11C 7/1066 711/E12.001 |
| 2014/0192583 A1* | 7/2014 | Rajan | G11C 7/10 365/63 |

(Continued)

FOREIGN PATENT DOCUMENTS

KR    10-2009-9092006 A    8/2009

OTHER PUBLICATIONS

International Search Report and Written Opinion for International Application No. PCT/US2022/031558, dated Sep. 23, 2022, 8 pages.

*Primary Examiner* — Rocio Del Mar Perez-Velez
*Assistant Examiner* — Tong B. Vo
(74) *Attorney, Agent, or Firm* — Polansky & Associates, P.L.L.C.; Paul J. Polansky (57) ABSTRACT

A data processor includes a staging buffer, a command queue, a picker, and an arbiter. The staging buffer receives and stores first memory access requests. The command queue stores second memory access requests, each indicating one of a plurality of ranks of a memory system. The picker picks among the first memory access requests in the staging buffer and provides selected ones of the first memory access requests to the command queue. The arbiter selects among the second memory access requests from the command queue based on at least a preference for accesses to a current rank of the memory system. The picker picks accesses to the current rank among the first memory access requests of the staging buffer and provides the selected ones of the first memory access requests to the command queue.

20 Claims, 8 Drawing Sheets

(56) References Cited

U.S. PATENT DOCUMENTS

| | | |
|---|---|---|
| 2014/0372711 A1 | 12/2014 | O'Connor et al. |
| 2017/0255412 A1* | 9/2017 | Cox ..................... G06F 3/0604 |
| 2017/0345482 A1 | 11/2017 | Balakrishnan |
| 2018/0018105 A1* | 1/2018 | Magro .................. G06F 3/0674 |
| 2018/0018133 A1* | 1/2018 | Balakrishnan ........ G06F 3/0659 |
| 2018/0181329 A1* | 6/2018 | Bhati .................... G06F 9/3824 |
| 2019/0196987 A1* | 6/2019 | Shen .................... G06F 13/1642 |
| 2019/0303039 A1* | 10/2019 | Teh ...................... G06F 3/0604 |

* cited by examiner

EFFICIENT RANK SWITCHING IN MULTI-RANK MEMORY CONTROLLER

BACKGROUND

Computer systems typically use inexpensive and high-density dynamic random-access memory (DRAM) chips for main memory. Most DRAM chips sold today are compatible with various double data rate (DDR) DRAM standards promulgated by the Joint Electron Devices Engineering Council (JEDEC). DDR DRAMs offer both high performance and low power operation and DRAM manufacturers have offered DDR DRAMs that operate at increasingly fast clock speeds.

Modern DDR memory controllers maintain queues to store pending memory access requests to allow them to pick the pending memory access requests out of order to increase efficiency. For example, the memory controllers can retrieve multiple memory access requests to the same row in a given rank of memory from the queue out of order and issue them consecutively to the memory system to avoid the overhead of precharging the current row and activating another row.

Higher performance DDR memory systems provide multiple ranks of memory connected to a single memory channel and sharing most address, data, and control signals. These memory systems create complex timing constraints and can reduce memory bus efficiency if the memory controller frequently switches between ranks. However, the number of ranks in high-performance computing systems continues to grow. For example, DDR memory organized into one or more load reduced dual inline memory modules (LRDIMMs) can have four physical chip selects/physical ranks, and each chip select/physical rank can have eight logical ranks in a three-dimensional stacked (3DS) package. Moreover, over time DDR memories have been specified to operate using faster and faster memory clock signals. However, with these faster memory clock signals, certain timing parameters such as minimum write-to-read timings have increased proportionately, which reduces memory controller efficiency using known memory controllers.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processor includes a staging buffer, a command queue, a picker, and an arbiter. The staging buffer receives and stores first memory access requests. The command queue stores second memory access requests, each indicating one of a plurality of ranks of a memory system. The picker picks among the first memory access requests in the staging buffer and provides selected ones of the first memory access requests to the command queue. The arbiter selects among the second memory access requests from the command queue based on at least a preference for accesses to a current rank of the memory system. The picker picks accesses to the current rank among the first memory access requests of the staging buffer and provides the selected ones of the first memory access requests to the command queue.

A data processor includes a command queue and an arbiter. The command queue receives and stores decoded memory commands, wherein each decoded memory command includes information indicating a type and a rank, wherein the type indicates one of a read and a write. The arbiter is coupled to the command queue for selecting among the decoded memory commands from the command queue to provide to a memory channel based on a plurality of criteria. The arbiter is operable to determine whether the arbiter is near an end of a burst of write accesses, and if so to continue a burst of write accesses to a current rank for a predetermined number of times before starting a read burst.

A method for a memory controller to select memory access requests to provide to a memory channel having a plurality of ranks includes initiating a burst of write accesses. A write access to a current rank is performed. Whether the memory controller is near an end of the burst of write accesses is determined. If the memory controller is not near the end of the burst of write accesses, the current rank is selectively switched, and performing a write access to a current rank and determining whether the memory controller is near an end of the burst of write accesses are repeated. If the memory controller is near the end of the burst of write accesses, the burst of write accesses to the current rank is continued for a predetermined number of times, waiting a write-to-read turnaround time and starting a read burst when any read access becomes timing eligible.

Figure 1:
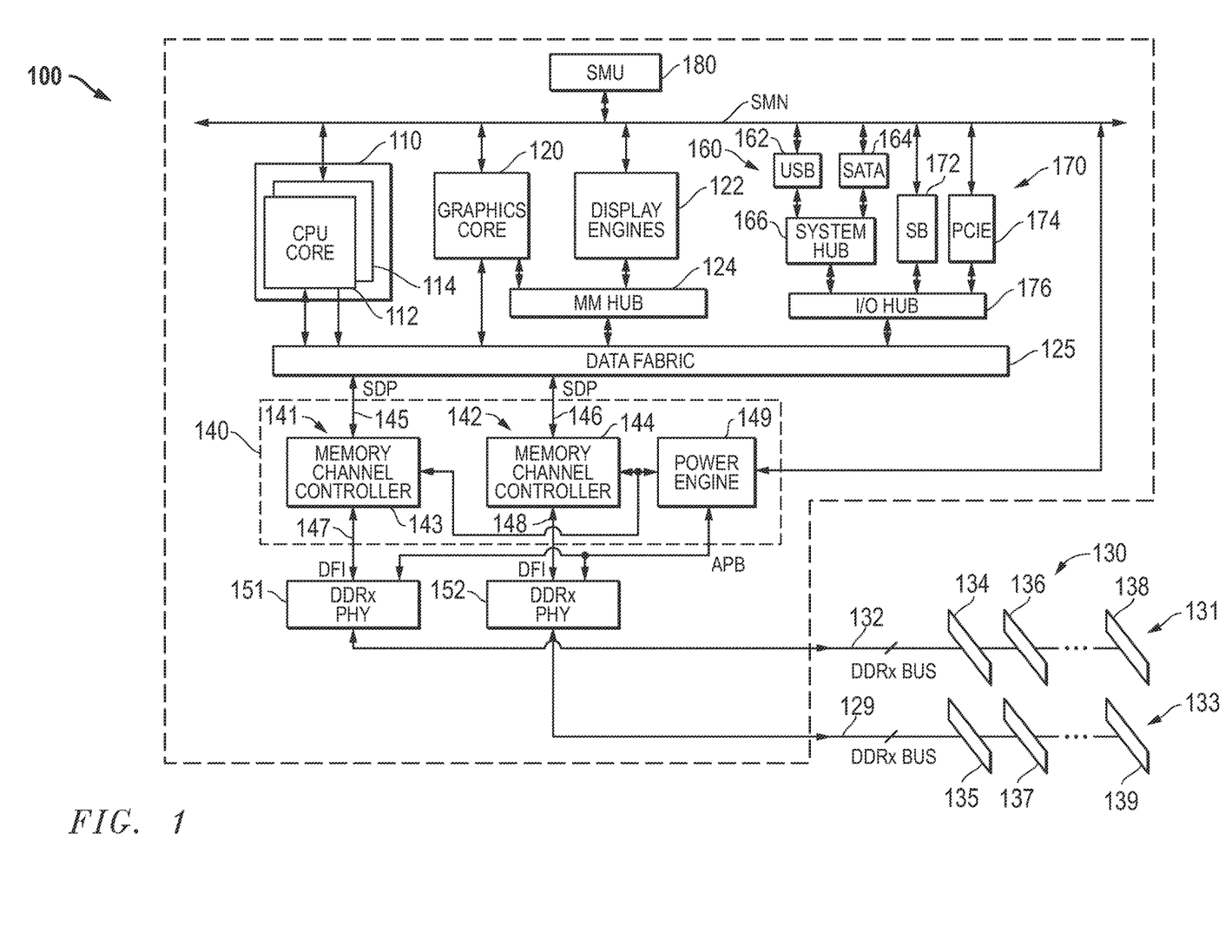
FIG. 1 illustrates in block diagram form an accelerated processing unit (APU) and memory system known in the prior art.

FIG. 1 illustrates in block diagram form an accelerated processing unit (APU) 100 and memory system 130 known in the prior art. APU 100 is an integrated circuit data processor suitable for use as a host processor in a data processing system, and includes generally a central processing unit (CPU) core complex 110, a graphics core 120, a set of display engines 122, a memory management hub 124, a data fabric 125, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125.

Each of CPU cores 112 and 114 may be unitary cores, or may further be a core complex with two or more unitary cores sharing certain resources such as caches.

Graphics core 120 is a high-performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 124 for uniform translation into appropriate addresses in memory system 130, and memory management hub 124 is bidirectionally connected to data fabric 125 for generating such memory accesses and receiving read data returned from the memory system.

Data fabric 125 includes a crossbar switch for routing memory access requests and memory responses between any memory accessing agent and memory controller 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory controller 140 and its associated physical interfaces (PHYs) 151 and 152 are integrated with APU 100 in this embodiment. Memory controller 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory controller 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
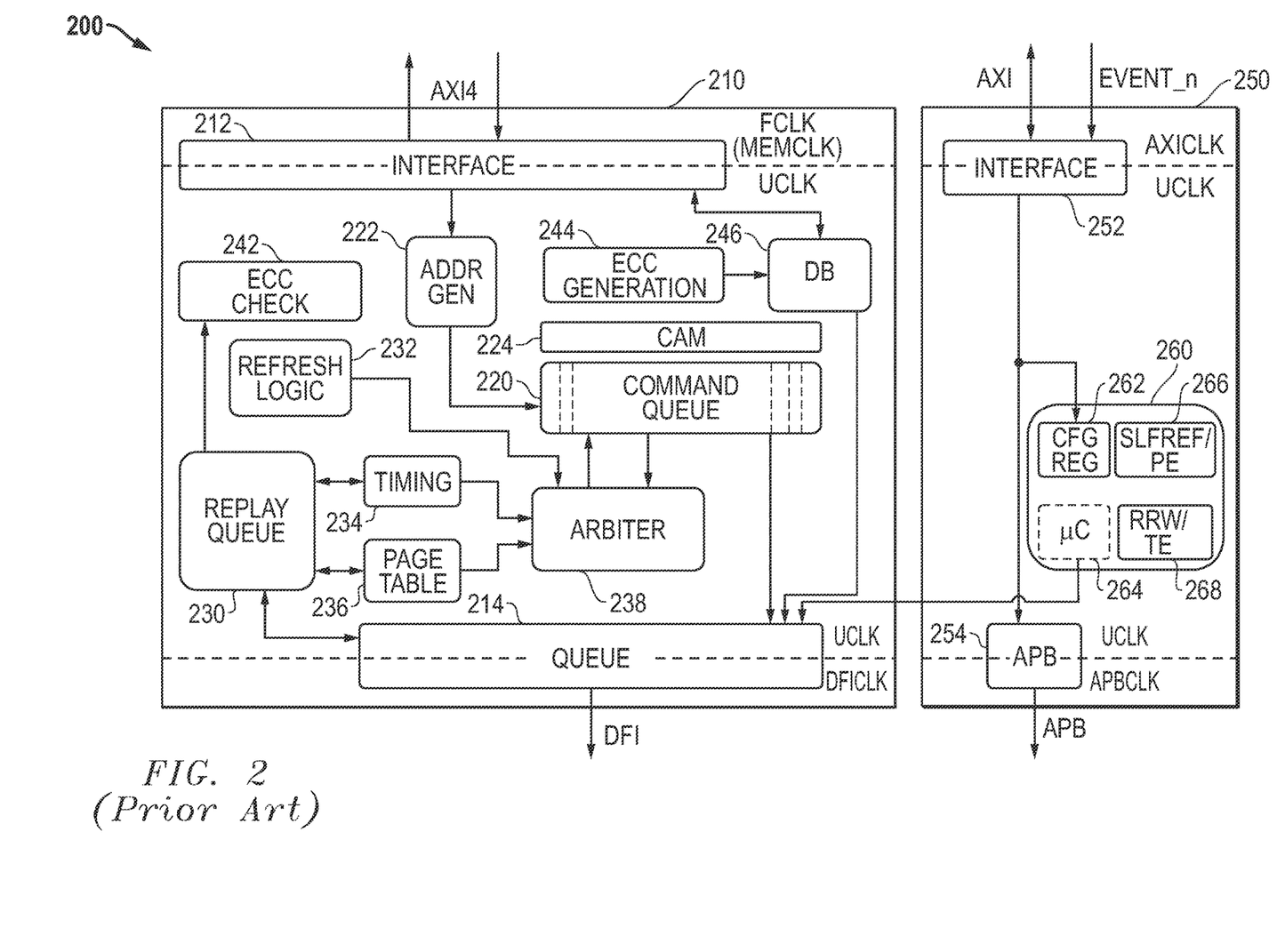
FIG. 2 illustrates in block diagram form a memory controller known in the prior art.

FIG. 2 illustrates in block diagram form a memory controller 200 known in the prior art. Memory controller 200 includes a memory channel controller 210 and a power controller 250. Memory channel controller 210 includes an interface 212, a memory interface queue 214, a command queue 220, an address generator 222, a content addressable memory (CAM) 224, a replay queue 230, a refresh logic block 232, a timing block 234, a page table 236, an arbiter 238, an error correction code (ECC) check block 242, an ECC generation block 244, and a data buffer (DB) 246.

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to the DFICLK domain associated with the DFI interface.

Address generator 222 decodes addresses of memory access requests received from data fabric 125 over the AXI4 bus. The memory access requests include access addresses in the physical address space represented in as a normalized address. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Replay queue 230 is a temporary queue for storing memory accesses picked by arbiter 238 that are awaiting responses, such as address and command parity responses, write cyclic redundancy check (CRC) responses for DDR4 DRAM or write and read CRC responses for GDDR5 DRAM. Replay queue 230 accesses ECC check block 242 to determine whether the returned ECC is correct or indicates an error. Replay queue 230 allows the accesses to be replayed in the case of a parity or CRC error of one of these cycles.

Refresh logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 232 generates auto-refresh commands periodically to prevent data errors caused by leaking of charge off storage capacitors of memory cells in DRAM chips. In addition, refresh logic 232 periodically calibrates ZQ to prevent mismatch in on-die termination resistance due to thermal changes in the system. Refresh logic 232 also decides when to put DRAM devices in different power down modes.

Arbiter 238 is bidirectionally connected to command queue 220 and is the heart of memory channel controller 210. It improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands to the same bank, known as "tRc". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

In response to write memory access requests received from interface 212, ECC generation block 244 computes an ECC according to the write data. DB 246 stores the write data and ECC for received memory access requests. It outputs the combined write data/ECC to memory interface queue 214 when arbiter 238 picks the corresponding write access for dispatch to the memory channel.

Power controller 250 includes an interface 252 to an advanced extensible interface, version one (AXI), an APB interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (μC) 264, a self refresh controller (SLFREF/PE) 266, and a reliable read/write training engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh logic 232. Reliable read/write training engine 268 provides a continuous memory access stream to memory or I/O devices for such purposes as DDR interface read latency training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as QoS requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 may decide to keeps pages open in different banks until they are required to be precharged prior to selecting a different page.

Figure 3:
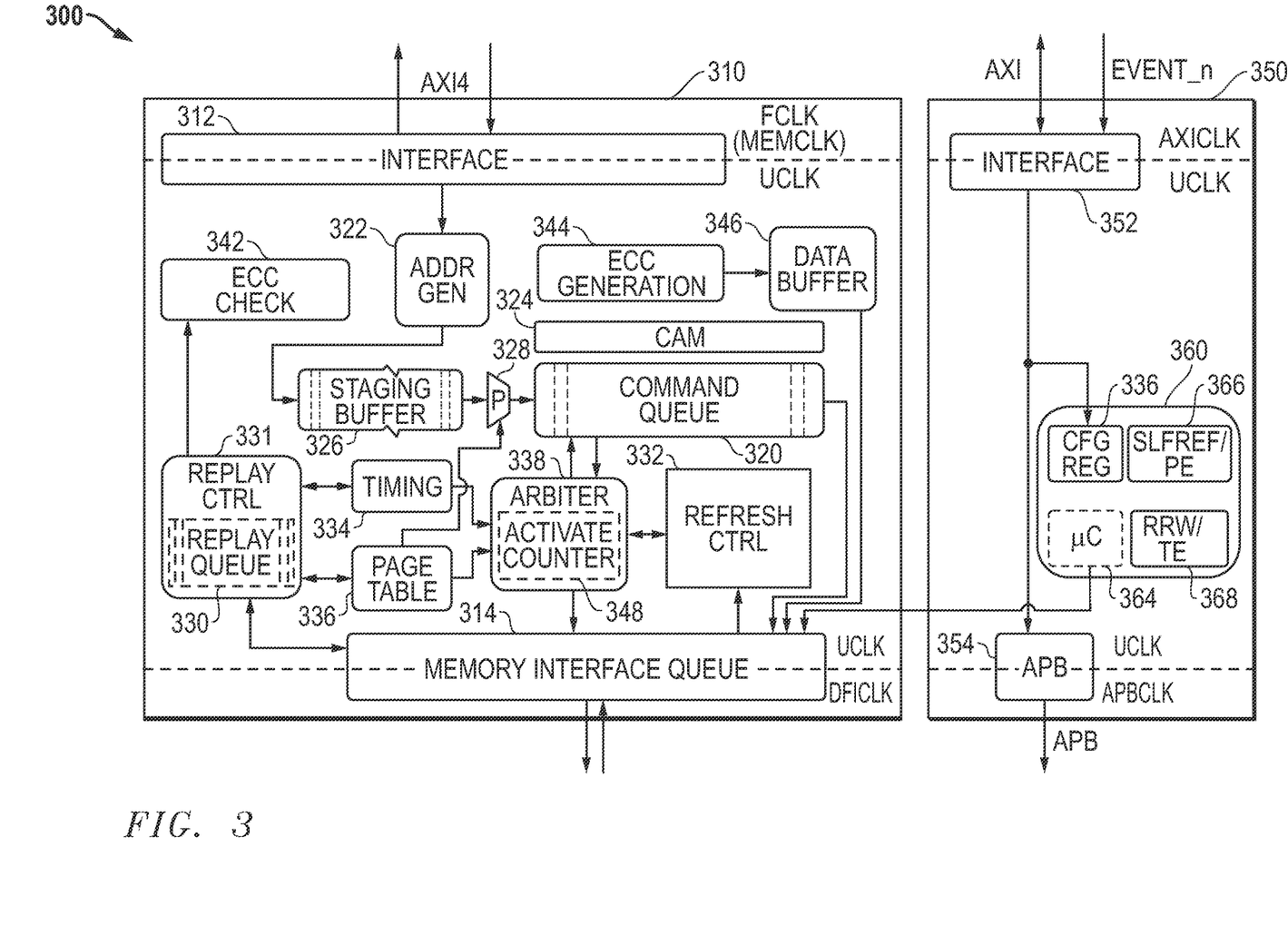
FIG. 3 illustrates in block diagram form a memory controller that can be used in the APU of FIG. 1 according to some embodiments.

FIG. 3 illustrates in block diagram form a memory controller 300 that can be used in APU 100 of FIG. 1 according to some embodiments. Memory controller 300 includes many elements having corresponding reference numbers to those in FIG. 2. Since they function in the same or a similar way, they will not be described again.

However, memory controller 300 operates more efficiently in multi-rank systems than memory controller 200 of FIG. 2, and the differences between memory controller 300 and memory controller 200 will now be described. In addition to command queue 320 that operates similarly to command queue 220 of FIG. 2, memory controller 300 includes a staging buffer 326 and a picker 328. Staging buffer 326 has an input connected to the output of address generator 322, and an output. Picker 328 has an input connected to staging buffer 326, a control input connected to a second output of page table 336, and an output connected to the input of command queue 320. Page table 336 is similar to page table 236 of FIG. 2, but has been modified to provide additional information about the currently-selected rank and in some embodiments additional rank information, as will now be described.

In operation, memory controller 300 operates more efficiently with a multi-rank memory system than memory controller 200 of FIG. 2. Conversely, memory controller 300 requires less circuit area than memory controller 200 of FIG. 2 to operate with a certain rank switching efficiency in a multi-rank system.

Memory controller 300 adds staging buffer 326 and picker 328 to provide a higher rank-hit rate for a given size of command queue 320. Moreover as will be described further below, memory controller 300 also facilitates efficient write-to-read switching in a many-rank memory system. Address generator 322 decodes the memory accesses into at least a rank. In one particular embodiment, address generator 322 decodes the accesses into a rank, a bank, a row, and a column. Staging buffer 326 receives and stores memory access requests that have been decoded by address generator 322. Staging buffer 326 is only used to pick among accesses based on rank rather than based on other arbitration criteria, and requires fewer fields in each entry. Thus, each entry in staging buffer 326 requires less circuit area than a corresponding entry in command queue 320.

Picker 328 picks from among the memory access requests stored in staging buffer 326 and provides the selected accesses to the input of command queue 320. In one embodiment, picker 328 picks accesses to the current rank and to a second rank over accesses to any other rank. In this case, page table 336 stores the current rank and the second rank (or indications thereof) and provides them to picker 328. In this case, page table 336 receives the current rank and the second rank from arbiter 338, and stores the current rank and the second rank in addition to the current page for each bank and rank, and provides the current rank to an input of picker 328. Picker 328 picks accesses from staging buffer 326 from either the current rank and the second rank over accesses to any other rank. Picker 328 attempts to pick about the same number of accesses from the two ranks in a rotating fashion to hide single-rank four-access window ($t_{FAW}$) and activate-to-activate ($t_{RRD}$) timing constraints. If there are no remaining accesses to the current rank and/or the second rank in staging buffer 326, then picker 328 can pick accesses from staging buffer 326 in various ways. According to one embodiment, arbiter 338 implements a scoreboard of the number of accesses per ranks in staging buffer 326. The scoreboard tracks the number of accesses per rank stored in staging buffer 326. When picker 328 finishes picking requests in one rank, arbiter 338 will pick the next rank as a rank which was qualified by having the most requests among candidate ranks. That is, when staging buffer 326 stores no more accesses to the current rank and/or the second rank, arbiter 338 is operable to cause picker 328 to pick accesses from a third rank, in which the third rank has a number of accesses greater than or equal to the number of accesses of any other rank in staging buffer 326. By using this scoreboarding technique, arbiter 338 can achieve fewer overall rank switches.

In another embodiment, picker 328 picks accesses to a current rank being selected by arbiter 338 over accesses to any other rank. In this case, page table 336 receives the current rank (or an indication of the current rank) from arbiter 338 and stores it in addition to the current page for each bank and rank, and provides the current rank to an input of picker 328. If there are no remaining accesses to the current rank in staging buffer 326, then picker 328 picks accesses from staging buffer 326 in the order received.

By including staging buffer 326 and picker 328, memory controller 300 increases the average number of same-rank accesses that can be picked from command queue 320 before a rank switch is necessary. It does so by increasing the memory access command window size according to both the depth of command queue 320 and the depth of staging buffer 326. This mechanism decreases the number of rank switches during a sequence of accesses. Moreover, each entry in staging buffer 326 is significantly smaller than a corresponding entry in command queue 320, and thus memory controller 300 improves the tradeoff between additional circuit area and improved rank switching efficiency.

In a many-rank system with a large number of ranks, staging buffer 326 provides significant increases in rank-switching efficiency compared to memory controller 200 of FIG. 2. For example, command queue 320 may have a total of 64 entries in a 32-rank memory system. If the accesses were evenly spread across the multiple ranks, then on average, command queue 320 would store two accesses from each rank. Performing a rank turn-around every two memory access requests would produce significantly lower efficiency compared to a system with a much smaller number of ranks. Memory controller 300 adds staging buffer 326 to increase the window of accesses visible to arbiter 338 so that more accesses to the current rank and the second rank can be placed in command queue 320. At the same time, it does not increase the size of command queue 320 or the complexity of arbiter 338.

An entry in command queue 320 includes many more fields than an entry in staging buffer 326. Picker 328 only picks entries of staging buffer 326 based on rank to provide to command queue 320. Thus picker 328 can be implemented as a relatively simple circuit. Moreover because of its smaller size for each entry, staging buffer 326 can include more entries than command queue 320. This feature is important in many-rank systems with a large number of expected memory ranks.

An additional efficiency issue occurs in multi-rank systems due to same-bank write-to-read turnarounds. This mechanism as well as an improved arbitration system for handling this problem will now be described.

Figure 4:
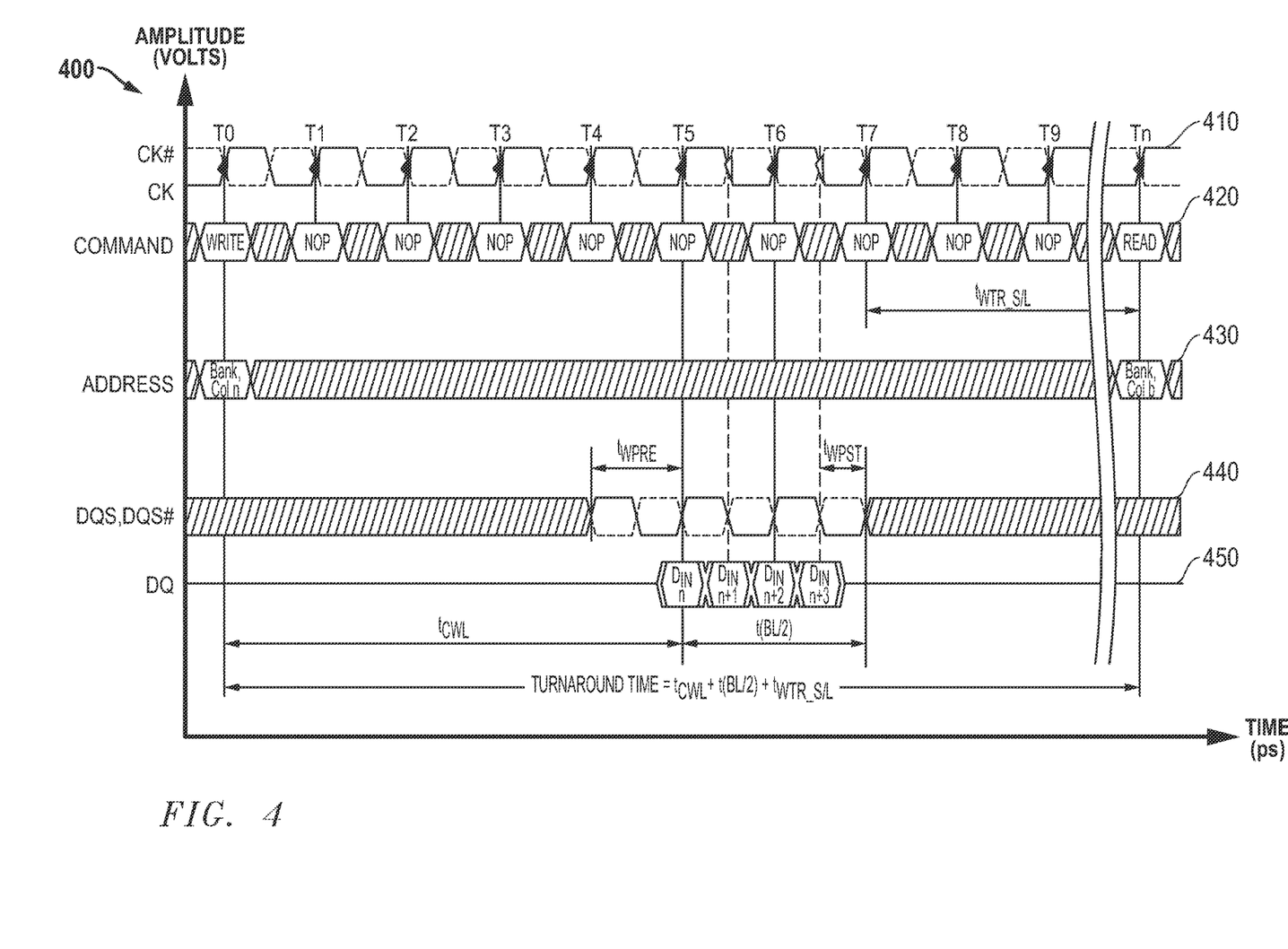
FIG. 4 illustrates a timing diagram illustrating the components of write-to-read turnaround time.

FIG. 4 illustrates a timing diagram 400 illustrating the components of write-to-read turnaround time. In FIG. 4, the horizontal axis represents time in picoseconds (ps), and the vertical axis represents the amplitude of various signal of interest in volts. Timing diagram 400 includes a waveform 410 of memory command clock signal labelled "CK" and its complement labelled "CK #", a waveform 420 of a command signal labelled "COMMAND", a waveform 430 of an address signal labelled "ADDRESS", a waveform 440 of a true data strobe signal labelled "DQS" and its complement labelled "DQS #", and a waveform 450 of a data signal labelled "DQ" that represents a composite number of data signals, such as eight bits.

The CK and CK # signals form a differential clock signal that a DDR memory chip uses to register commands and to time the input and output of data. Timing diagram 400 illustrates particular transitions labelled "T0" through "T9", as well as a transition labelled "Tn" that occurs an amount of time after T7 determined by the memory and clock speed.

The COMMAND is registered on the low-to-high transition of the CK signal and the high-to-low transition of the CK # signal. Shown in timing diagram 400 are a write command occurring at T0 followed by a read command occurring at Tn separated by no-operation (NOP) encodings on the COMMAND signals. The COMMAND signals include a set of individual signals that memory controller 300 uses to encode the particular type of command. These signals and the encoding thereof are specified by the corresponding DDR standard, and since they are well-known, they will not be described further.

As shown in timing diagram 400, the WRITE cycle at time T0 is to a particular bank and column in a given rank labeled "Bank, Col n", and the READ cycle is to a different bank and column of the same rank at Tn labeled "Bank, Col b". The minimum amount of time between T0 and Tn is known as the turnaround time, and in this case is the same-rank write-to-read turnaround time. The same-rank write-to-read turnaround time is determined by three individual timing components that will now be described with reference to the particular WRITE command shown in timing diagram 400.

Figure 5:
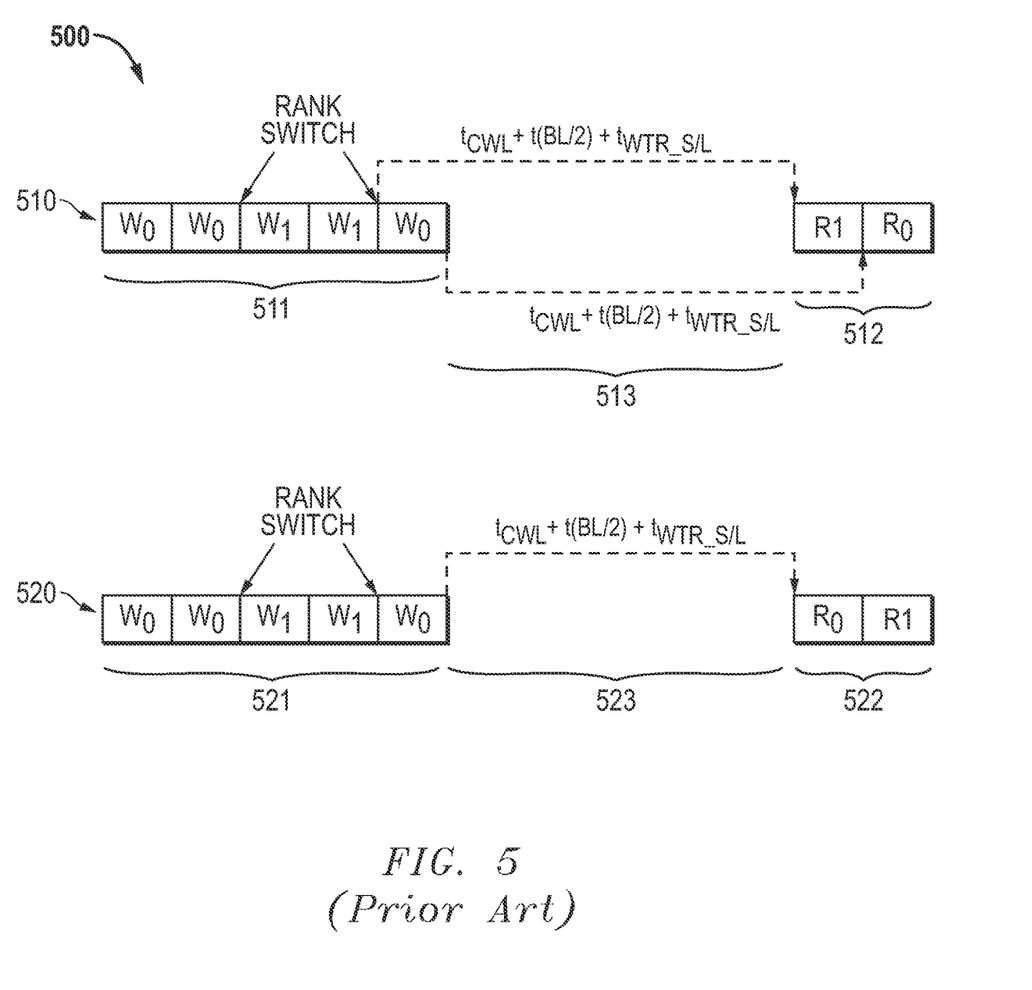
FIG. 5 illustrates a set of timelines of memory accesses that may be selected by a memory controller known in the prior art.

The amount of time from the issuance of the WRITE command until write data is provided to the memory chip is known as column write latency, or $t_{CWL}$. As shown in FIG. 5, $t_{CWL}$ is the time from T0 to T5, or five clock cycles in this example.

The write cycle initiated by the WRITE command to T0 causes to data to be written starting at time T5. Before T5, the memory controller provides a preamble period in the DQS and DQS # signals. Timing diagram 400 is a timing diagram for a DDR4 SDRAM, and the preamble consists of DQS going high for one half clock cycle at T4, then going low for one half clock cycle, and then going high again at T5 to cause the first data element to be written to the memory. As shown in timing diagram 400, the write cycle is a burst of four in which data is transferred on four half-cycles defined by four consecutive transitions of the DQS and DQS # signals. For a write cycle, the memory controller drives both the data strobe signals DQS and DQS # and the data signal DQ. The transitions in the DQS and DQS # signals occur in the middle of the valid time for each data value at the memory chips, shown in timing diagram 400 as values "$D_{IN}n$", "$D_{IN}n+1$", "$D_{IN}n+2$", and "$D_{IN}n+3$", in which the "IN" designator represents data output by the memory controller and input to the memory. The length of a burst of four is labelled t(BL/2), in which BL is equal to the number of cycles in the write burst. Thus in timing diagram 400, t(BL/2) is equal to two clock cycles. After the memory controller transmits the last data element, it provides a postamble in the DQS/DQS # signals, in which DQS goes low for one-half clock cycle and DQS # goes high for the same one-half clock cycle.

The amount of time from the end of the DQS postamble until the subsequent READ command can be accepted is known to the write-to-read time, or $t_{WTR}$. It is shown in timing diagram 400 as occurring between T7 and Tn, and is a minimum number of clock cycles determined by the clock speed and the DDR version.

The overall same-rank write-to-read turnaround time is given by Equation 1:

$$\text{SAME-RANK TURNAROUND TIME} = t_{CWL} + t_{(BL/2)} + t_{WTR\_S/L} \quad (1)$$

in which $t_{WTR\_S}$ is the same-rank write-to-read turnaround time for accesses to different bank groups, and $t_{WTR\_L}$ is the same-rank write-to-read turnaround time for accesses to the same bank group. Timing diagram 400 shows the example of a DDR4 memory. In this example for a clock speed of 1866 megaHertz (MHz). $t_{CWL}=5$, t(BL/2)=2, and $t_{WTR\_L}=14$, for a total of 21 clocks. In DDR5 memories with a clock speed of 6400 MHz, same-rank turnaround time can be over 70 clock cycles.

FIG. 5 illustrates a set of timelines 500 of memory accesses that can be selected by a memory controller known in the prior art. In timelines 500, time proceeds from left to right. Timelines 500 include a first timeline 510 and a second timeline 520. First timeline 510 shows a burst of write accesses 511 and a subsequent burst of read accesses 512 separated by an overhead period 513. As used in FIG. 5 and elsewhere, a "burst" of write or read accesses means a succession or streak of individual memory access commands, each of which includes multiple data transfers. While the set of individual data transfers is also conventionally referred to as a "burst", the present disclosure is related to bursts of memory access commands rather than to the individual data transfers. However the appropriate meaning of "burst" will be readily apparent from its context.

In burst of write accesses 511, a write access labeled "$W_0$" is a write access to rank 0 and a write access labeled "$W_1$" is a write access to rank 1. When the memory controller performs rank switches within the burst, it incurs a relatively small overhead penalty or "bubble". The memory controller prefers to switch ranks to continue the write burst over switching between write and read access types because of the relatively long write-to-read turnaround time. Thus, in the example shown in first timeline 510, the memory controller picks two write accesses to rank 0, followed by two write accesses to rank 1, followed by one write accesses to rank 0 before performing a write-to-read turnaround.

In burst of read accesses 512, a read accesses labeled "$R_0$" is a read accesses to rank 0 and a read accesses labeled "$R_1$" is a read accesses to rank 1. All accesses including read accesses picked by the memory controller must satisfy all timing eligibility specifications, including same-rank write-to-read turnaround time given by equation [1] above. In the example shown in first timeline 510, a read access to rank 1 is not available until the write-to-read turnaround time to rank 1 is satisfied, so the memory controller starts the read burst with that access to rank 1. The very next cycle a read access to rank 0 becomes available to be issued and the write-to-read turnaround time to rank 0 has by then been satisfied, so memory controller picks a read to rank 0 as the next access.

Overhead period 513 represents the period of time in which the memory controller cannot pick any memory accesses because they have not yet become timing eligible due to the same-rank write-to-read turnaround time. This period of time is relatively long and significantly decreases the efficiency of the system.

Second timeline 520 shows a burst of write accesses 521 and a subsequent burst of read accesses 522 separated by an overhead period 523. Second timeline 520 is similar to first timeline 510 except that there is no read access available at the expiration of the same-bank write-to-read turnaround time after the last access to bank 1. Thus, the memory controller waits the full same-bank write-to-read turnaround time after the last access to bank 0. Subsequently, before the first read access, the read access to rank 1 becomes available, and memory controller picks it in the read burst after the access to rank 0.

The inventors have discovered that a rank switch near the end of the write burst (e.g., burst of write accesses 511 or 521) increases the inefficiency due to the long same-bank write-to-read turnaround time. According to various embodiments disclosed herein, however, a data processor and method avoids a rank switch near the end of a write burst and reduces the bubble to a much smaller amount, thereby increasing memory controller efficiency.

To solve this efficiency problem, the inventors have discovered that an opportunity exists in a multi-rank system to reduce the inefficiency ordinarily caused be a write-to-read turnaround, and have developed a data processor and memory controller having an arbiter 338 that exploits this opportunity to improve efficiency and memory bus utilization.

Figure 6:
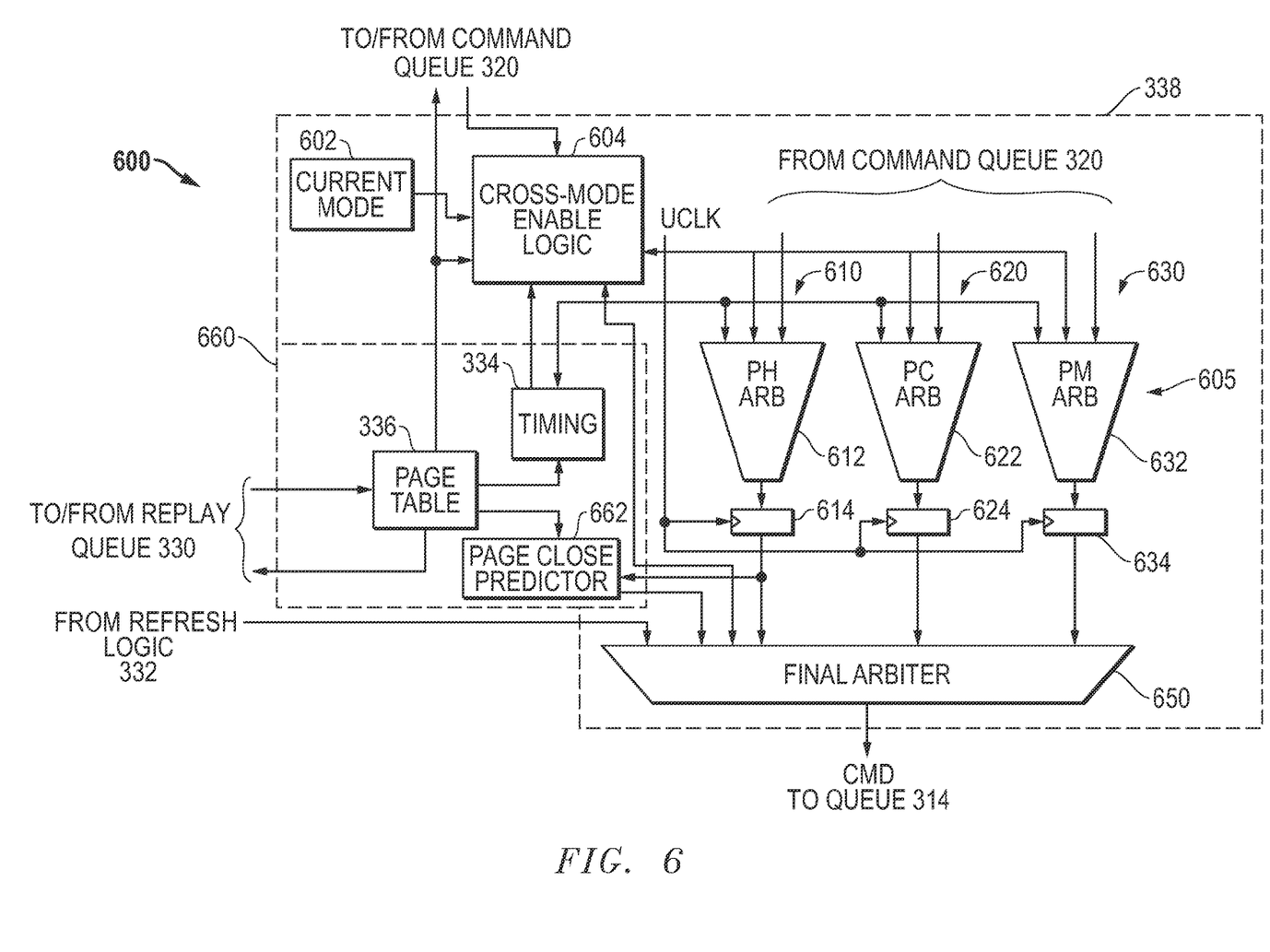
FIG. 6 illustrates a block diagram of a portion of the memory controller of FIG. 3 according to some embodiments.

FIG. 6 illustrates a block diagram of a portion 600 of memory controller 300 of FIG. 3 according to some embodiments. Portion 600 includes arbiter 338 and a set of control circuits 660 associated with the operation of arbiter 338.

Arbiter 338 includes a set of sub-arbiters 605 and a final arbiter 650. Sub-arbiters 605 include a sub-arbiter 610, a sub-arbiter 620, and a sub-arbiter 630. Sub-arbiter 610 includes a page hit arbiter 612 labeled "PH ARB", and an output register 614. Page hit arbiter 612 has a first input connected to command queue 320, a second input, and an output. Register 614 has a data input connected to the output of page hit arbiter 612, a clock input for receiving the UCLK signal, and an output. Sub-arbiter 620 includes a page conflict arbiter 622 labeled "PC ARB", and an output register 624. Page conflict arbiter 622 has a first input connected to command queue 320, a second input, and an output. Register 624 has a data input connected to the output of page conflict arbiter 622, a clock input for receiving the UCLK signal, and an output. Sub-arbiter 630 includes a page miss arbiter 632 labeled "PM ARB", and an output register 634. Page miss arbiter 632 has a first input connected to command queue 320, a second input, and an output. Register 634 has a data input connected to the output of page miss arbiter 632, a clock input for receiving the UCLK signal, and an output. Final arbiter 650 has a first input connected to the output of refresh logic 332, a second input from a page close predictor 662, a third input connected to the output of output register 614, a fourth input connected to the output of output register 624, a fifth input connected to the output of output register 634, and an output for providing an arbitration winner labelled "CMD" to memory interface queue 314. In some embodiments, final arbiter 650 is able to pick two sub-arbitration winners per memory controller clock cycle.

Control circuits 660 include timing block 334 and page table 236 corresponding to and as previously described with respect to timing block 234 and page table 236 of FIG. 2, and a page close predictor 662, a current mode register 602, and cross-mode enable logic 604. Timing block 334 has an output connected to cross-mode enable logic 604, an input and an output connected to page hit arbiter 612, page conflict arbiter 622, and page miss arbiter 632. Page table 336 has an input connected to an output of replay queue 230, an output connected to an input of replay queue 330, an output connected to the input of command queue 320, an output connected to the input of timing block 334, and an output connected to the input of page close predictor 662. Page close predictor 662 has an input connected to one output of page table 336, an input connected to the output of output register 614, and an output connected to the second input of final arbiter 650. Cross-mode enable logic 604 has an input connected to current mode register 602, and input connected to command queue 320, an input and output connected to final arbiter 650, and an input and output connected to sub-arbiter 610, sub-arbiter 620, and sub-arbiter 630.

In operation, arbiter 338 selects memory access commands from command queue 320 and refresh logic 332 by taking into account the current mode (indicating whether a read streak or write streak is in progress), the page status of each entry, the priority of each memory access request, and the dependencies between requests. The priority is related to the quality of service or QoS of requests received from the AXI4 bus and stored in command queue 320, but can be altered based on the type of memory access and the dynamic operation of arbiter 338. Arbiter 338 includes three sub-arbiters that operate in parallel to address the mismatch between the processing and transmission limits of existing integrated circuit technology. The winners of the respective sub-arbitrations are presented to final arbiter 650. Final arbiter 650 selects between these three sub-arbitration winners as well as a refresh operation from refresh logic 332, and may further modify a read or write command into a read or write with auto-precharge command as determined by page close predictor 662.

Cross-mode enable logic 604 operates to cause and manage streaks of read commands and streaks of write commands over the memory channel. During a current streak of either type of commands, cross-mode enable logic 604 monitors an indicator of data bus efficiency of the memory channel. In response to the indicator of data bus efficiency indicating that data bus efficiency is less than a designated threshold, cross-mode enable logic 604 stops the current streak, starts a streak of the other type, and changes the current mode in current mode register 602.

Each of page hit arbiter 612, page conflict arbiter 622, and page miss arbiter 632 has an input connected to the output of timing block 334 to determine timing eligibility of commands in command queue 320 that fall into these respective categories. Timing block 334 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, GDDR5 memories require more timers to comply with more timing parameters than other DDRx memory types. By including an array of generic timers implemented as binary counters, timing block 334 can be scaled and reused for different memory types. The inputs from cross-mode enable logic 604 signal the sub-arbiters which type of commands, read or write, to provide as candidates for final arbiter 650.

A page hit is a read or write cycle to an open page. Page hit arbiter 612 arbitrates between accesses in command queue 320 to open pages. The timing eligibility parameters tracked by timers in timing block 334 and checked by page hit arbiter 612 include, for example, row address strobe (RAS) to column address strobe (CAS) delay time ($t_{RCD}$) and CAS latency ($t_{CL}$). For example, $t_{RCD}$ specifies the minimum amount of time that must elapse before a read or write access to a page after it has been opened in a RAS cycle. Page hit arbiter 612 selects a sub-arbitration winner based on the assigned priority of the accesses. In one embodiment, the priority is a 4-bit, one-hot value that therefore indicates a priority among four values, however it should be apparent that this four-level priority scheme is just one example. If page hit arbiter 612 detects two or more requests at the same priority level, then the oldest entry wins.

A page conflict is an access to one row in a bank when another row in the bank is currently activated. Page conflict arbiter 622 arbitrates between accesses in command queue 320 to pages that conflict with the page that is currently open in the corresponding bank and rank. Page conflict arbiter 622 selects a sub-arbitration winner that causes the issuance of a precharge command. The timing eligibility parameters tracked by timers in timing block 334 and checked by page conflict arbiter 622 include, for example, active to precharge command period ($t_{RAS}$). Page conflict arbiter 622 selects a sub-arbitration winner based on the assigned priority of the access. If page conflict arbiter 622 detects two or more requests at the same priority level, then the oldest entry wins.

A page miss is an access to a bank that is in the precharged state. Page miss arbiter 632 arbitrates between accesses in command queue 320 to precharged memory banks. The timing eligibility parameters tracked by timers in timing block 334 and checked by page miss arbiter 632 include, for example, precharge command period ($t_{RP}$). If there are two or more requests that are page misses at the same priority level, then the oldest entry wins.

Each sub-arbiter outputs a priority value for their respective sub-arbitration winner. Final arbiter 650 compares the priority values of the sub-arbitration winners from each of page hit arbiter 612, page conflict arbiter 622, and page miss arbiter 632. Final arbiter 650 determines the relative priority among the sub-arbitration winners by performing a set of relative priority comparisons taking into account two sub-arbitration winners at a time. The sub-arbiters may include a set of logic for arbitrating commands for each mode, read and write, so that when the current mode changes, a set of available candidate commands are quickly available as sub-arbitration winners.

After determining the relative priority among the three sub-arbitration winners, final arbiter 650 then determines whether the sub-arbitration winners conflict (i.e., whether they are directed to the same bank and rank). When there are no such conflicts, then final arbiter 650 selects up to two sub-arbitration winners with the highest priorities. When there are conflicts, then final arbiter 650 complies with the following rules. When the priority value of the sub-arbitration winner of page hit arbiter 612 is higher than that of page conflict arbiter 622, and they are both to the same bank and rank, then final arbiter 650 selects the access indicated by page hit arbiter 612. When the priority value of the sub-arbitration winner of page conflict arbiter 622 is higher than that of page hit arbiter 612, and they are both to the same bank and rank, final arbiter 650 selects the winner based on several additional factors. In some cases, page close predictor 662 causes the page to close at the end of the access indicated by page hit arbiter 612 by setting the auto precharge attribute.

Within page hit arbiter 612, priority is initially set by the request priority from the memory accessing agent but is adjusted dynamically based on the type of accesses (read or write) and the sequence of accesses. In general, page hit arbiter 612 assigns a higher implicit priority to reads, but implements a priority elevation mechanism to ensure that writes make progress toward completion.

Whenever page hit arbiter 612 selects a read or write command, page close predictor 662 determines whether to send the command with the auto-precharge (AP) attribute or not. During a read or write cycle, the auto-precharge attribute is set with a predefined address bit and the auto-precharge attribute causes the DDR device to close the page after the read or write cycle is complete, which avoids the need for the memory controller to later send a separate precharge command for that bank. Page close predictor 662 takes into account other requests already present in command queue 320 that access the same bank as the selected command. If page close predictor 662 converts a memory access into an AP command, the next access to that page will be a page miss.

Cross-mode enable logic 604 reduces the inefficiency caused by same-rank write-to-read turnaround time by controlling sub-arbiters 605 to avoid a rank switch near the end of a write burst. To fully hide the same-rank write-to-read overhead, there would need to be a number L of same-rank write requests available at the end of the write burst:

$$L=(t_{CWL}+t_{(BL/2)}+t_{WTR\_S/L})/t_{CCD} \qquad [2]$$

in which $t_{CCD}$ is the column address strobe (CAS)-to-CAS delay.

In one example, cross-mode enable logic 604 may determine that it is "near the end" of the write burst by determining that the total number of writes in command queue 320 is less than a fixed threshold. In another example, cross-mode enable logic 604 may determine that it is "near the end" of the write burst by determining that the number of writes in command queue 320 to a rank other than the current rank is less than L. In either case, when cross-mode enable logic 604 detects the "near the end" condition, it does not allow a write burst to switch to the other rank. These constraints may leave some writes out of the burst when switching to the read burst.

Figure 7:
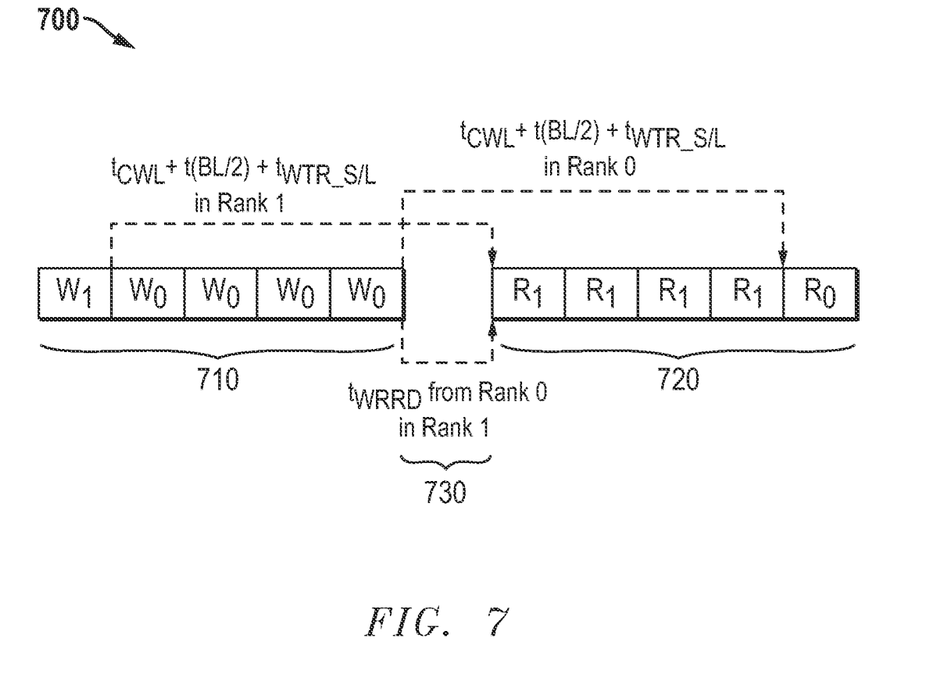
FIG. 7 illustrates a timeline of memory accesses selected by the arbiter of FIG. 6 according to some embodiments.

FIG. 7 illustrates a timeline 700 of memory accesses selected by arbiter 338 of FIG. 6 according to some embodiments. In timeline 700, time proceeds from left to right. Timeline 700 shows a burst of write accesses 710 and a subsequent burst of read accesses 720 separated by an overhead period 730. Burst of write accesses 710 includes a write access to rank 1 is followed by a four write accesses to rank 0. Burst of read accesses 720 includes four read accesses to rank 1 is followed by a read access to rank 0. As shown in timeline 700, timing eligibility includes a same bank write-to-read turnaround time from the end of the write access to rank 1 to the first read access to rank 1 that is satisfied at the beginning of burst of read accesses 720. Similarly, there is a same bank write-to-read turnaround time from the end of the last write access to rank 0 to the read access to rank 0, which is satisfied at the beginning of read access to rank 0 in burst of read accesses 720.

In addition, there is a different-rank write-to-read turnaround latency, labelled "$t_{WRRD}$" during which the memory controller is unable to use the memory bus, causing inefficiency. $t_{WRRD}$ is significantly shorter than $t_{WTR\_S/L}$. Moreover, $t_{WRRD}$ scales up slower than $t_{WTR\_S/L}$ as the memory clock speed increases. For example, for high-rate DDR5 SDRAMs running at 6400 MHz, $t_{CWL}$ is 54 memory clock cycles and $t_{WTR}$ is 30 memory clock cycles, whereas $t_{WRRD}$ is between 10 and 20 memory clock cycles, dependent on the board design, causing a difference between same-rank and different-rank turnaround to be greater than about 70 memory clock cycles.

Staging buffer 326 may enhance the ability to avoid the same-rank write-to-read turnaround time penalty may be assisted by the use of staging buffer 326. If command queue 320 can see requests from many ranks, it will naturally do rank switches more often. To avoid command queue 320 seeing requests from too many ranks, picker 328 can temporarily leave unwanted requests in staging buffer 326. In this way, staging buffer 326 and picker 328 can reshape many-rank traffic to two-rank traffic by picking requests from only two active ranks.

For example, a sequence of requests spread evenly over five ranks and divided equally between reads and writes can be picked from staging buffer 326 such that command queue 320 focuses on only two ranks at a time. This technique ensures the majority of command requests are from only two ranks instead of many ranks and prevent too many rank switch times in between CAS commands. Picker 328 would pick requests from two preferred ranks until the requests from staging buffer are exhausted, and would then move to another rank (if a first rank is exhausted before the second rank) or to two other ranks (if both the first rank and the second rank are exhausted simultaneously).

Figure 8:
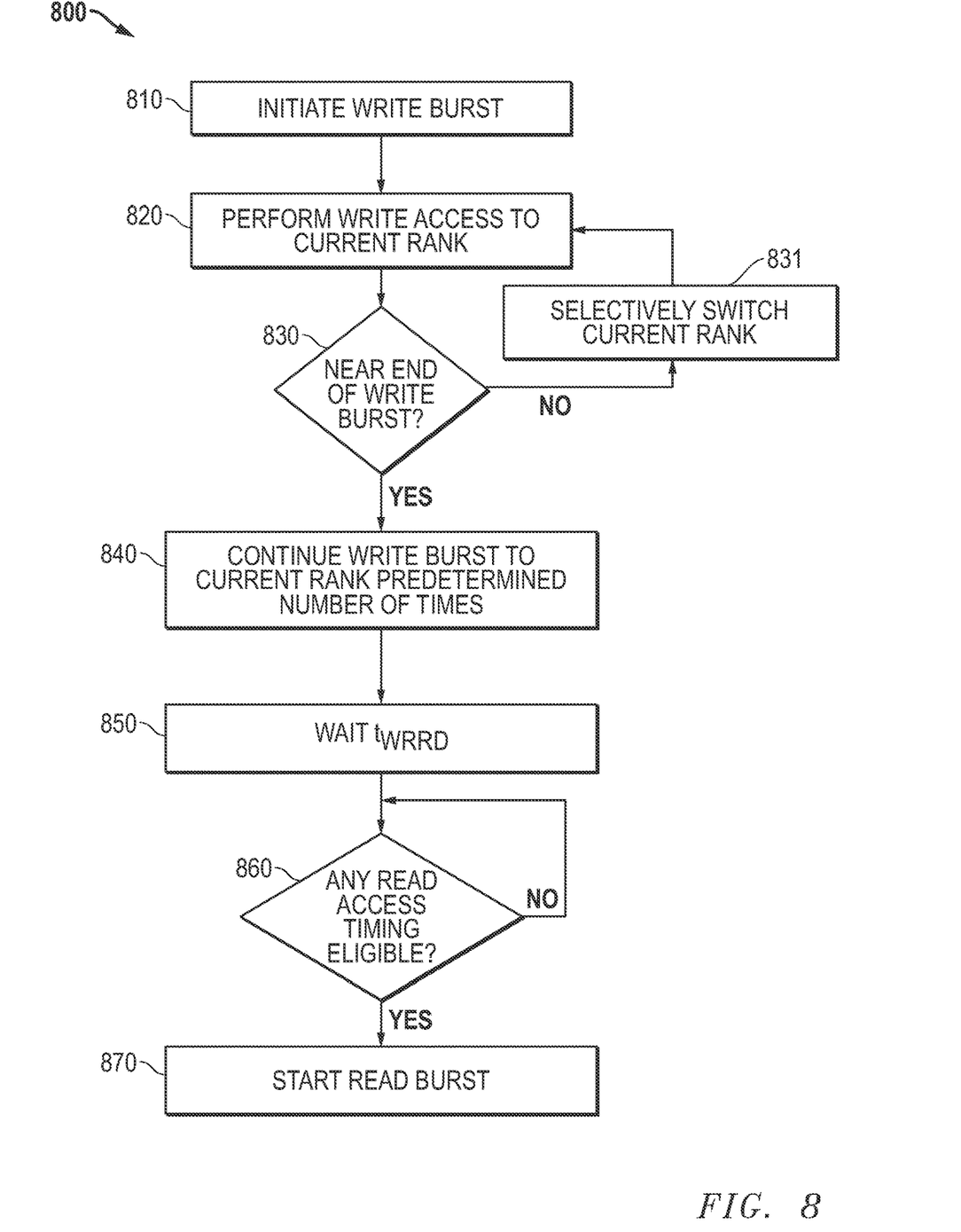
FIG. 8 is a flow chart of a technique for selecting accesses from a multi-rank system according to some embodiments.

FIG. 8 is a flow chart 800 of a technique for selecting accesses from a multi-rank system according to some embodiments. In an action box 810, memory controller 300 initiates a write burst. In an action box 820, memory controller 300 performs a write access to a current rank. Then in a decision box 830, memory controller 300 through, e.g., cross-mode enable logic 604, determines whether it is near the end of the write burst. For example, cross mode enable logic 604 may determine whether a total number of write accesses in command queue 320 is less than a predetermined number. In another example, cross mode enable logic 604 may determine whether a number of write accesses in command queue 320 to the current rank is sufficient to hide an overhead of a same-bank write-to-read turnaround time. If memory controller 300 is not near the end of the write burst, then in an action box 831, memory controller 300 determines whether to selectively switch the current rank to another rank. This switching can be based on other conventional memory controller selection criteria. After the current rank is selectively switched, flow returns to action box 820. If, however, memory controller 300 is near the end of the write burst, then in an action box 840 it continues the write burst to the current rank for a predetermined number of times. This predetermined number is selected to hide the same-rank write-to-read turnaround time. In an action box 850, it waits a much shorter rank write-to-read turnaround time $t_{WRRD}$. Then memory controller 300 starts a read burst when any read access becomes timing eligible, as indicated by a decision box 860 in which memory controller 300 determines whether any read access is timing eligible based on all timing criteria. If no read access is yet timing eligible, then the method continues to test the read accesses for timing eligibility. When a read access becomes timing eligible, then flow proceeds to an action box 870 in which memory controller 300 starts the read burst.

The disclosed technique enhances the efficiency of memory accesses by avoiding same-bank write-to-read turnaround times, instead waiting only the overhead of a different-bank write-to-read turnaround time, assuming some read access to a different rank is available. Moreover, it relies on existing timing eligibility checks to allow the arbiter to naturally select any timing eligible read access after the end of the write burst based on normal timing eligibility criteria.

Data processor 100 or any portions thereof, such as memory controller 300, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, various techniques of determining when the memory controller is near the end of a write burst are possible. Moreover, the write-to-read turnaround technique may be used independently of or in conjunction with the staging buffer and picker, in which the staging buffer and picker are well suited to expand the window for selecting desired accesses to place in the command queue in a many-rank system. While the example of picking a current rank and a second rank from the staging buffer to provide to the command queue was described, a different number of additional ranks could be chosen. Also, the circuit structure of the arbiter can be different in other embodiments.

Accordingly, it is intended by the appended claims to cover all modifications of the disclosed embodiments that fall within the scope of the disclosed embodiments.

What is claimed is:

1. A method for a memory controller to select memory access requests to provide to a memory channel having a plurality of ranks, comprising:
   initiating a burst of write accesses;
   performing a write access to a current rank;
   determining whether the memory controller is near an end of the burst of write accesses;
   in response to the memory controller not being near the end of the burst of write accesses:
      selectively switching said current rank; and
      repeating said performing and said determining;
   in response to the memory controller being near the end of the burst of write accesses:
      continuing said burst of write accesses to said current rank a predetermined number of times;
      waiting a write-to-read turnaround time; and starting a read burst when any read access becomes timing eligible.

2. The method of claim 1, wherein said determining whether the memory controller is near the end of the burst of write accesses comprises:
determining whether a total number of write accesses in a command queue of the memory controller is less than a predetermined number.

3. The method of claim 1, wherein said determining whether the memory controller is near the end of the burst of write accesses comprises:
determining whether a number of write accesses in a command queue of the memory controller to said current rank is sufficient to hide an overhead of a same-bank write-to-read turnaround time.

4. The method of claim 1, wherein said waiting said write-to-read turnaround time comprises:
waiting according to a column address strobe (CAS) write latency, a burst length, and a different-rank write-to-read turnaround time.

5. The method of claim 1, further comprising:
storing memory accesses in a staging buffer; and
picking write memory accesses from said staging buffer and storing said write memory accesses in a command queue of the memory controller based on whether said write memory accesses are from said current rank or another rank,
wherein said performing said write access to said current rank comprises performing said write access to one of said current rank and said other rank.

6. A data processor comprising:
a staging buffer for receiving and storing first memory access requests;
a command queue for storing second memory access requests, each of said second memory requests indicating one of a plurality of ranks of a memory system;
a picker for picking among said first memory access requests in said staging buffer and providing selected ones of said first memory access requests to said command queue; and
an arbiter for selecting among said second memory access requests from said command queue based on at least a preference for accesses to a current rank of the memory system,
wherein said picker picks said accesses to said current rank among said first memory access requests of said staging buffer and provides said selected ones of said first memory access requests to said command queue.

7. The data processor of claim 6, wherein:
said staging buffer stores more memory access requests than said command queue.

8. The data processor of claim 6, further comprising:
an address generator having an input for receiving memory access requests from a memory accessing agent, and an output coupled to an input of said staging buffer, wherein said address generator decodes each of said memory access requests into at least a rank.

9. The data processor of claim 6, wherein:
one of a plurality of criteria of said arbiter comprises a preference for switching ranks over switching between read requests and write requests.

10. The data processor of claim 9, wherein:
said arbiter is operable to select a burst of write accesses to a second rank between a burst of write accesses to a first rank and a subsequent burst of read accesses to said first rank in a response to a decision to perform a write-to-read turnaround.

11. The data processor of claim 10, wherein:
said arbiter is further operable to insert said burst of write accesses to said second rank when said subsequent burst of read accesses to said first rank otherwise has a higher priority than said burst of write accesses to said second rank.

12. The data processor of claim 10, wherein:
said picker further picks accesses to said current rank and said second rank among said first memory access requests of said staging buffer.

13. The data processor of claim 12, wherein:
when said staging buffer stores no more accesses to at least one of said current rank and said second rank among said first memory access requests, said arbiter is operable to cause said picker to pick accesses from a third rank, in which said third rank has a number of accesses greater than or equal to a number of accesses of any other rank in said staging buffer.

14. The data processor of claim 6, further comprising:
a memory controller including said staging buffer, said command queue, said picker, and said arbiter; and
a plurality of memory accessing agents coupled to said memory controller for generating said first memory access requests and said second memory access requests.

15. The data processor of claim 14, further comprising:
a physical interface circuit coupled to said memory controller and operable to access a plurality of ranks of a double data rate (DDR) dynamic random access memory channel.

16. A data processor comprising:
a command queue for receiving and storing decoded memory commands, wherein each of said decoded memory commands includes information indicating a type and a rank, wherein said type indicates one of a read and a write; and
an arbiter coupled to said command queue for selecting among said decoded memory commands from said command queue to provide to a memory channel based on a plurality of criteria, wherein said arbiter is operable to determine whether the arbiter is near an end of a burst of write accesses, and if the arbiter is near the end of the burst of write accesses, continue said burst of write accesses to a current rank for a predetermined number of times before starting a read burst.

17. The data processor of claim 16, wherein:
said arbiter determines that said arbiter is near said end of said burst of write accesses based on whether a total number of write accesses in said command queue is less than a predetermined number.

18. The data processor of claim 16, wherein:
said arbiter determines that said arbiter is near said end of said burst of write accesses based on whether a number of write accesses in said command queue to said current rank is sufficient to hide an overhead of a same-bank write-to-read turnaround time.

19. The data processor of claim 16, further comprising:
a memory controller including said command queue and said arbiter; and
a plurality of memory accessing agents coupled to said memory controller for generating memory access requests.

20. The data processor of claim 19, further comprising:
a physical interface circuit coupled to said memory controller and operable to access a plurality of ranks of a double data rate (DDR) dynamic random access memory channel.

* * * * *